May 26, 1942.  H. E. PAGE  2,284,228
PRESSURE MULTIPLYING MECHANISM
Filed March 18, 1940
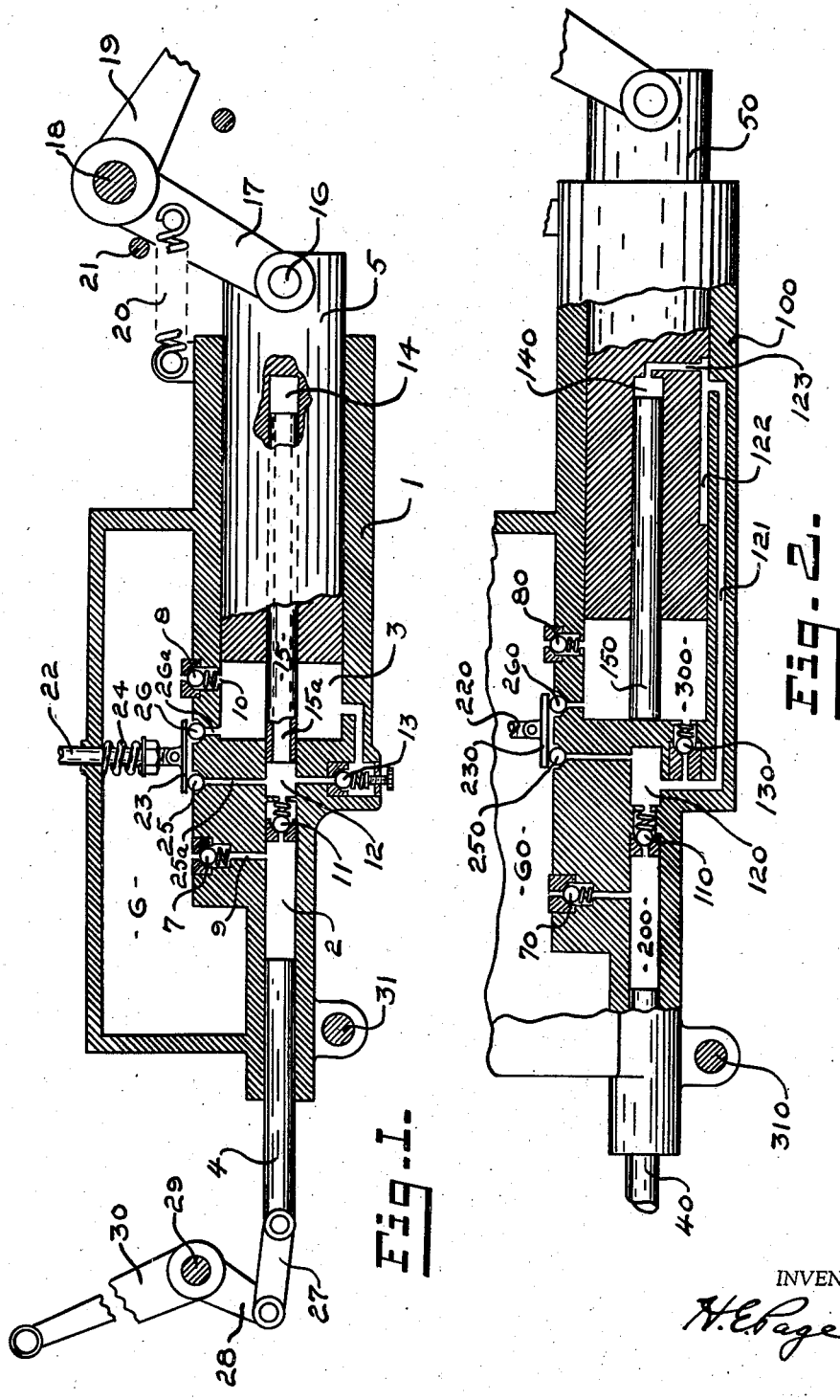
INVENTOR.
H. E. Page Patented May 26, 1942

2,284,228

UNITED STATES PATENT OFFICE 2,284,228

PRESSURE MULTIPLYING MECHANISM

Herbert E. Page, Syracuse, N. Y.

Application March 18, 1940, Serial No. 324,515

2 Claims. (Cl. 60—52)

This invention relates to hydraulic pressure multiplying mechanisms, and has for its object a simple construction by which a part to be actuated or driven member is quickly moved into position up against the work by very few movements of the operating lever, and after the driven member encounters the resistance of the work, then heavy pressure is applied automatically by successive operating movements of said operating lever.

It further has for its object a hydraulic pressure multiplying mechanism embodying a body held from movement in the direction of the piston movement and constructed with two or more piston chambers, pistons working in the chambers, one of the pistons being a prime mover, which may be actuated by hand, or in any suitable manner, and a transfer passage between the chambers having means, as a spring loaded check valve therein with enough resistance to normally prevent the transfer of the hydraulic liquid from the smaller or prime mover chamber to the larger or power chamber, and to permit the flow of liquid from the prime mover chamber to the power chamber when the driven member encounters resistance, so that upon preliminary operation, the driven or actuated part is quickly operated by one or two movements of the prime mover to take up lost motion between it and the work, and thereafter upon successive reciprocations of the prime mover, the liquid from the prime mover chamber is pumped into the larger power chamber, and the pressure multiplied in said chamber, to cause the actuated part to apply heavy pressure to the work.

It will be noted that the construction of this invention differs from that covered by my Patent No. 2,154,956 issued April 18, 1939, in that the latter utilizes a shiftable body containing an anchored or fixed power piston and rod while in this invention the body of the mechanism is fixed and the power piston is shiftable.

I have here illustrated my invention as applied to a hydraulic lifting jack.

In describing this invention, reference is had to the accompanying drawing in which like characters designate corresponding parts in all the views.

Figure 1 is a longitudinal sectional view through the pressure multiplying mechanism.

Figure 2 is a similar view embodying a modified form of that shown in Figure 1.

I is the body which is formed with piston chambers 2 and 3 extending lengthwise thereof, these chambers being of different diameters and arranged in axial alinement, the chamber 3 of the larger diameter being a power chamber for applying heavy pressure.

4 and 5 are pistons working respectively in said chambers 2 and 3.

The body I is also formed with a reservoir 6 for a hydraulic liquid and spring loaded valves 7 and 8 allow the hydraulic liquid to flow from the reservoir 6 through the passages 9 and 10 into the piston chambers 2 and 3 respectively but act to prevent any reverse flow of said liquid.

Spring loaded check valve 11 mounted at the right end of the chamber 2 allows hydraulic fluid to flow from said piston chamber 2 into an intermediate or transfer chamber 12 formed in the body and adjusting spring loaded check valve 13 allows fluid to flow from chamber 12, when the pressure is high enough, into chamber 3 and both check valves 11 and 13 act to prevent any reverse flow of said liquid.

The piston 5 has a piston or pressure chamber 14 extending lengthwise therein and another piston 15 with a hydraulic liquid passage 15ª extending through same and having its left end fixed in the body I, is adapted to move freely in the piston chamber 14. Heavy pressure piston 5 is connected at 16 to one arm 17 of a bell crank pivoted at 18 to a fixed point and the other arm 19 is provided with a suitable head, not shown, which rests against the work to which the pressure is to be applied, or in the case of a jack, against the article to be raised. The retracting spring 20 acts to keep the arm 17 normally against the stop 21. The parts 18, 19 are one form of means or mechanism for transmitting the motion of the piston 5 to the work.

Suitable release valve means are provided for releasing the pressure in the piston chambers to permit the mechanism to return to normal or starting position, when desired. The mechanism here illustrated is as follows:

A rod 22 passes through the upper portion of the reservoir 6 and is connected to a head or disk 23 and a spring 24 acts on the rod and tends to keep the disk 23 pressed up against the balls 25 and 26 and thus prevent any flow of hydraulic liquid from the chambers 12 and 3 into the reservoir 6 through release passages or ports 25ª, 26ª, until the rod 22 is raised by any suitable means, not shown. The passage 25ª communicates with the intermediate chamber 12 and with the smaller piston chamber through the passage controlled by the check valve 11.

The prime mover piston 4 may be actuated in any suitable manner. As here shown, the prime mover piston 4 is connected by the link 27 to the lower arm 28 of a bell crank actuating lever pivoted at 29 to a fixed point, as the frame or carriage (not shown) for the mechanism and having an upper or actuating arm 30. The body I is also pivoted at a fixed point 31.

In operation, the operating lever 30 is first moved toward the right, and this moves the piston 4 to the left by means of the arm 28 and the link 27 and this movement of the piston 4 draws hydraulic fluid from the reservoir 6 through the check 7 and passage 9 into the chamber 2. The operating lever 30 is then moved to the left and this moves the piston 4 to the right and the liquid in the chamber 2 can not go back through the check 7 so it is forced through the check valve 11 into the chamber 12 and through the passage 15ª into the chamber 14, and thus acts on the piston 5 moving said piston quickly to the right. Continued reciprocation of the operating lever 30 continues to force liquid into the chamber 12 until the piston 5 acting through the levers 17 and 19 encounters the resistance of the work and this resistance naturally increases the pressure of the liquid in the chamber 12, and then the liquid is forced through the adjustable spring loaded check 13 into the chamber 3 and thus acts on the end of the large piston 5 and greatly increases the power of said piston 5.

It will be noted that during the initial movement of the piston 5 by means of the hydraulic pressure in the chamber 14, additional hydraulic liquid is drawn through the check valve 8 which keeps the space 3 filled with liquid.

After the desired work has been accomplished and it is desired to return the working parts to normal or initial position, the rod 22 is raised, which allows the balls 25 and 26 to raise from their seats and either the action of the retaining spring 20 or the weight of the load will act through the arm 17 and the piston 5 and force the liquid in the chamber 3 and the liquid in chamber 14 past the balls 26 and 25 respectively into the reservoir 6, and thus allow the piston 5 and the arms 17 and 18 to return to their original position.

It is evident that the operating principle just described will be the same if the small piston 15 was fixed within the large piston 5 and was free to move in the chamber 12 which would be made deep enough to allow such movement.

In Figure 2 a construction is shown in which the small piston 150 moves freely within the large piston 50 and does not have its left end secured or fixed to the body 100.

In Figure 2, the body 100 is pivoted to a fixed point in a suitable frame, not shown, at 310 and said body is formed with piston chambers 200 and 300 extending lengthwise thereof, these chambers being of different diameters and the larger chamber 300 being the power chamber. The pistons 40 and 50 work in the chambers 200 and 300 respectively.

The body 100 is formed with a reservoir 60 and spring loaded check valves 70 and 80 act to allow the hydraulic liquid to flow from the reservoir 60 into the piston chambers 200 and 300 respectively but prevent any reverse flow of said liquid.

Spring loaded check valve 110 mounted at the right end of the chamber 200 allows hydraulic fluid to flow from said chamber 200 into chamber 120 and check valve 130 allows liquid to flow from chamber 120 into the chamber 300, when the pressure is high enough, and all of above check valves act to prevent any reverse flow of hydraulic fluid.

Hydraulic fluid can also flow from the chamber 120 through the passage 121 into the passage 122 and through the passage 123 into the chamber 140 at which point any pressure of the hydraulic fluid acts against the right end of the piston 150 and the other end of the piston 150 acts against the body 100 and thus tends to force the piston 50 to the right.

The rod 220 acting through the disk 230 pressing on the balls 250 and 260 acts to prevent any fluid from returning from the chambers 120 and 300 respectively into the reservoir 60 until said rod 220 is raised against the action of its retaining spring, not shown.

In operation, the piston 40 is oscillated by any suitable means, and this draws hydraulic fluid through the check 70 into the chamber 200, and then forces said fluid through the check 110 into the chamber 120 and through the passages 121, 122 and 123 into the chamber 140, where the pressure of the fluid acts against the floating piston 150 and said piston acts against the body 100 and the re-action of the force in the chamber 140 causes the piston 50 to move quickly to the right. Continued oscillation of the piston 40 causes a continuance of this operation until the piston 50 encounters the resistance of the work, and this resistance increases the pressure in the fluid in the chamber 140 which also increases the pressure in the fluid in the chamber 120, and this increase of pressure overcomes the resistance of the spring loaded check valve 130 and allows hydraulic fluid to flow from the chamber 120 into the chamber 300 and thus act on the large surface of the piston 50, thus producing great pressure with slower movement of said piston.

Raising lever 220 and releasing the balls 250 and 260 from their seats allows the liquid to escape from the chambers 140, 120 and 300 into the reservoir 60 and the piston 50 can return to its original position.

What I claim is:

1. In a pressure multiplying mechanism, the combination of a body element including piston chambers of different diameters arranged in axial alinement, an intermediate chamber, and a reservoir for a hydraulic fluid overlying like sides of the alined piston chambers and communicating with the piston chambers through check valve controlled passages extending radially relatively to the piston chambers and communicating with the intermediate chamber and the larger piston chamber through radial passages having normally-closed release valves, the smaller piston chamber communicating with the intermediate chamber through a check valve controlled passage, the larger piston being formed with a pressure chamber extending lengthwise thereof, an open passage connecting the intermediate chamber and the pressure chamber in the larger piston and a check valve controlled by-pass between the intermediate chamber and the larger piston chamber, a prime mover for actuating the smaller piston, and motion transmitting means operated by the larger piston.

2. The pressure multiplying transmission mechanism of claim 1 in which the passage between the intermediate chamber and the pressure chamber in the larger piston is provided by a stationary tubular rod extending lengthwise of the larger piston chamber and the pressure chamber therein with the passage of the rod communicating with the intermediate chamber.

HERBERT E. PAGE.